United States Patent

Cederberg et al.

(10) Patent No.: US 7,783,033 B2
(45) Date of Patent: *Aug. 24, 2010

(54) NETWORK BREAKER

(75) Inventors: Olle Cederberg, Äkersberga (SE); Per Almstedt, Hägersten (SE); Mats Sjodin, Linköping (SE); Kenth Skoglund, Linghem (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/905,710

(22) Filed: Oct. 3, 2007

(65) Prior Publication Data

US 2008/0056482 A1 Mar. 6, 2008

Related U.S. Application Data

(62) Division of application No. 10/507,480, filed as application No. PCT/SE02/00450 on Mar. 12, 2002, now Pat. No. 7,457,406.

(51) Int. Cl.
*H04M 1/00* (2006.01)
*H04M 9/00* (2006.01)

(52) U.S. Cl. .................................. 379/413.04

(58) Field of Classification Search .............. 379/413.04
See application file for complete search history.

(56) References Cited

U.S. PATENT DOCUMENTS

| 4,626,633 A | 12/1986 | Ruehl et al. |
| 4,852,153 A | 7/1989 | Streck |
| 4,937,464 A | 6/1990 | Nanba et al. |
| 5,414,765 A | 5/1995 | Lanquist et al. |
| 6,099,333 A | 8/2000 | Daoud et al. |
| 6,530,085 B1 * | 3/2003 | Perlman ................... 725/82 |
| 7,457,406 B2 | 11/2008 | Cederberg et al. |
| 2002/0132506 A1 * | 9/2002 | Wilson et al. ............. 439/207 |
| 2003/0077941 A1 | 4/2003 | Wojtacki et al. |

FOREIGN PATENT DOCUMENTS

| EP | 1158612 A2 | 11/2001 |
| WO | WO 01/80536 A1 | 10/2001 |

OTHER PUBLICATIONS

Elfa Catalogue, Jan. 2002, p. 659, art. No. 42-694-03, "Mellanpropps_Kablage".

* cited by examiner

*Primary Examiner*—Alexander Jamal
(74) *Attorney, Agent, or Firm*—Nixon & Vanderhye P.C.

(57) ABSTRACT

A converted telephone plug inserted into the first jack of a traditional, local telephony network breaks the normal connection to a public switched telephony network (PSTN) and reroutes signals to special telephony equipment for further connection to a modern access network. The advantages are that local analog telephones, can be used as interfaces also against the modern network and that installation becomes easy.

7 Claims, 5 Drawing Sheets

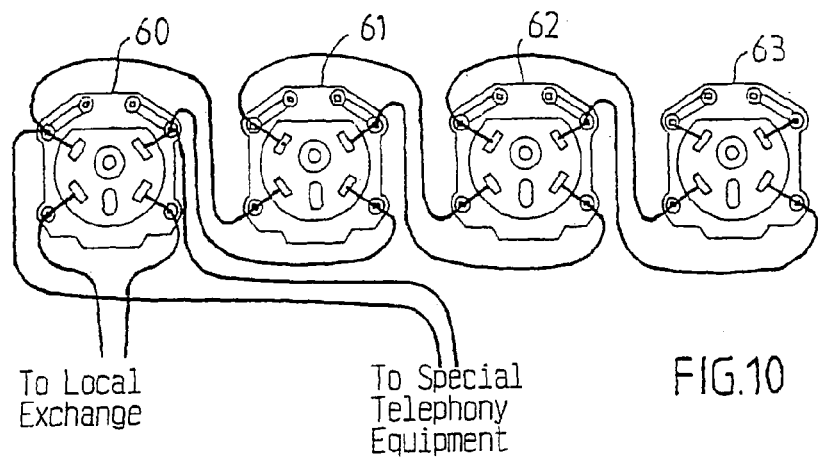
FIG.10
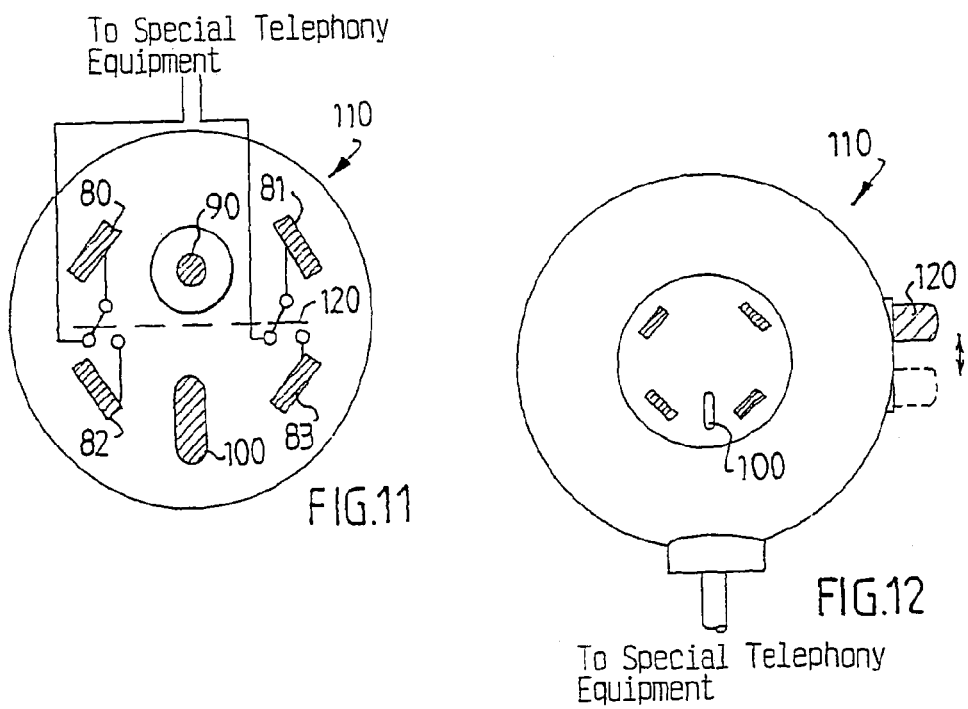
FIG.11
FIG.12

NETWORK BREAKER

This application is a divisional of U.S. application Ser. No. 10/507,480, filed on Jan. 1, 2005 now U.S. Pat. No. 7,457,406, which is the US national phase of international application PCT/SE02/00450 filed 12 Mar. 2002, which designated the U.S. The entire contents of these applications are incorporated herein by reference.

FIELD OF THE INVENTION

The present invention relates to connecting equipment in different ways within and between local and public telephony networks.

BACKGROUND

In recent years there has been an extensive development towards using more modern access network technologies in telephony and this also turns out to be a challenge for the traditional circuit switched technology. An example there is the IP telephony, which is taking a growing share of the market. It is also possible to use traditional analog telephones as interfaces against specialized kinds of access networks, by using special telephony equipment that converts the analog signals to a format suitable for such a network. FIG. 1 illustrates this situation, where the analog telephone and the special telephony equipment represent the local network placed in the residential area of the subscriber, and the access network is the telephone operator's equipment outside the residential area.

Most often there is a number of telephony Jacks installed in the residential area. These jacks are connected in series and there is a first jack that is connected to the traditional Public Switched Telephony Network (PSTN). This is shown in FIG. 2. These serially connected jacks may be called a local telephony network.

If the analog telephones of the local telephony network instead are to be used as interfaces against a modern access network, e.g., a digital network, the signals have to be converted to the format of this network by means of some kind, of special telephony equipment, see FIG. 3. A problem to solve is how to use the existing jacks in the residential area together with the special telephony equipment in an optimum way, that is with a least possible change of the jacks and equipment installed.

One non-optimum solution consists in physically cutting the connection to the PSTN and connecting the first jack to the special telephony equipment instead. This is seen in FIG. 4. The problem is that cutting wires to the PSTN and rewiring of the first jack requires professional installation work, resulting in additional costs.

SUMMARY OF THE INVENTION

It is an object of the present invention to avoid manual cutting and rewiring work as much as possible when connecting special devices to standard telephone jacks.

Thus, a converted telephony plug is used, connected to the special telephony equipment. The function of the converted plug when plugging it into the first jack is to disable the connection between the local telephony network and the PSTN and, at the same time, to obtain a connection between the special telephony equipment and the local telephony network. In this way, it becomes possible to use the local analog telephones in the residential area as interfaces against the access network. The special telephony equipment, in turn, is supposed to be permanently connected to the access network.

The converted plug thus allows for the combination of various telephony technologies in traditional modern access networks, acting both as a circuit breaker and a routing device. Another advantage is that installation becomes easy. The customer can do it himself without any professional work needed.

BRIEF DESCRIPTION OF THE DRAWINGS

The following figures are referred to in the background section of the present invention as well as in the description of particular embodiments by way of example only, and are not to be thought of as limitative:

FIG. 10 is a schematic view of jacks in a local telephony network where a special plug is inserted into the first jack while all other jacks are connected to local analog telephones.

FIG. 11 is a view of the pin configuration of a special plug where the upper pin pairs can be manually switched between the special telephony equipment and the PSTN.

FIG. 12 is a view of a special plug having a manual switch.

DETAILED DESCRIPTION

Figure 1:
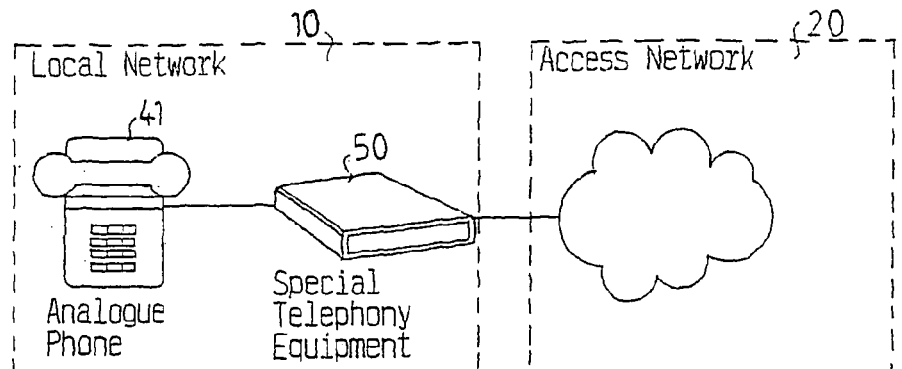
FIG. 1 is a schematic view, illustrating an analog telephone connected to an access network via special telephony equipment.
Figure 2:
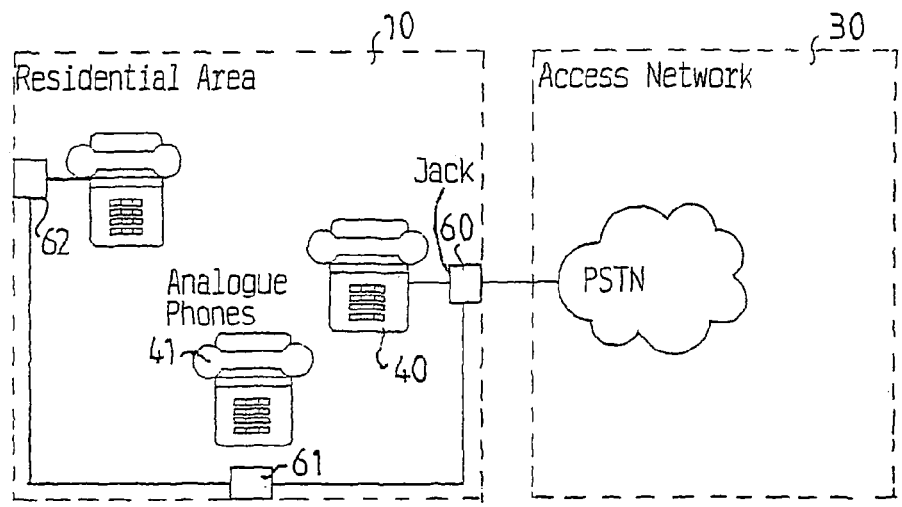
FIG. 2 is a schematic view of analog telephones serially connected to a traditional, public switched telephony network (PSTN).
Figure 3:
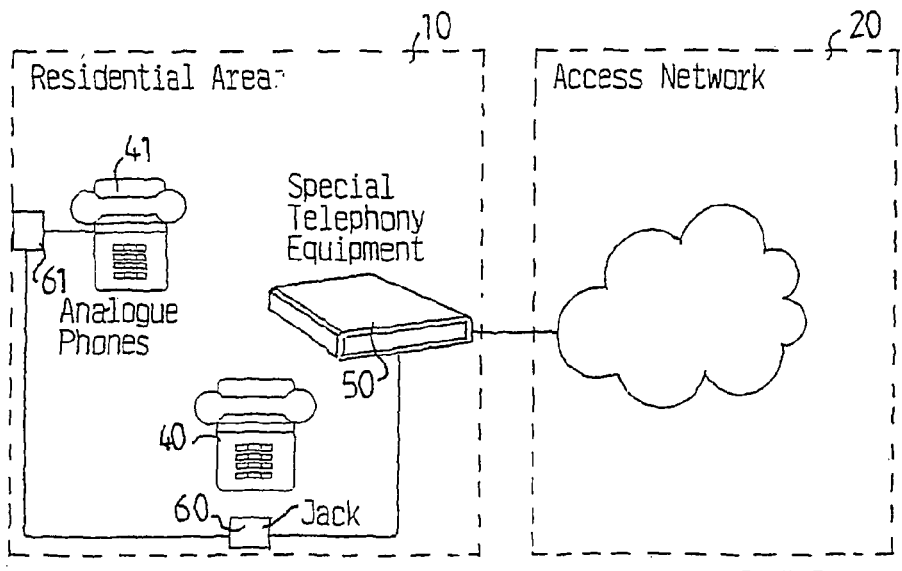
FIG. 3 is a schematic view, illustrating several analog telephones connected to an access network via special telephony equipment.
Figure 4:
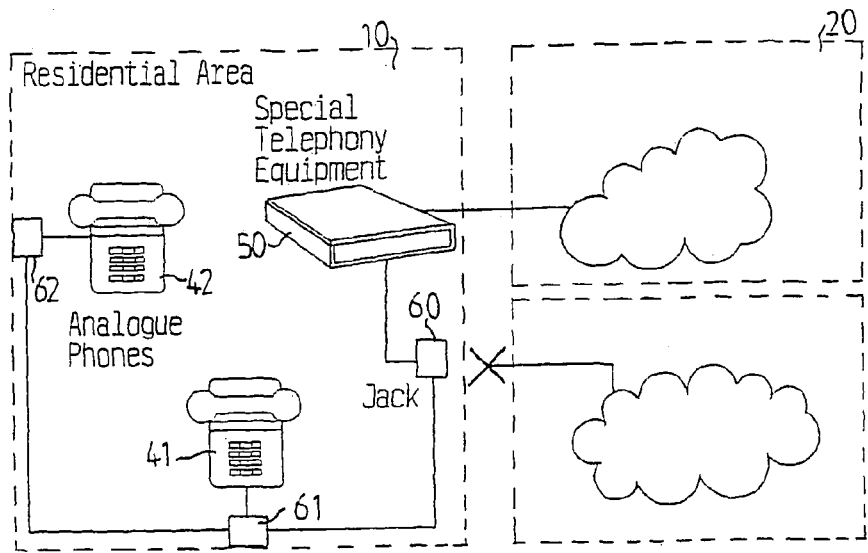
FIG. 4 is a schematic view, illustrating how local telephony equipment can be connected to special telephony equipment and thereby to an access network instead of the PSTN by physically cutting the connection to the PSTN.

In FIG. 1 conventional IP-telephony is illustrated where an analog telephone 41 and special telephony equipment 50 represent a local network 10 placed in the residential area of a subscriber. The analog telephone is as shown connected through the special telephony equipment to an access network 20 that is constituted by the equipment of the telephone communication operator outside the residential area. The special telephony equipment 50 converts the analog signals to a format suitable for IP telephony and vice versa. Often a plurality of telephony jacks 60, 61, 62 serially connected to each other are installed in the residential area as seen in the network of FIG. 2 that illustrates the case where the analog telephones are all connected to a traditional Public Switched Telephony Network (PSTN) 30. A first one 60 of the jacks is thus connected to the PSTN. A plurality of analog telephones 40, 41 connected for IP-telephony is seen in FIG. 3 as coupled through the special telephony equipment or converter 50 converting signals between the formats used by the analog telephones in the local network 10 and by the modern access network 20, such as a digital network. This connection of the first jack 60 in the local network is not compatible with the connection according to FIG. 2, as illustrated in FIG. 4. There, the connection to the PSTN 30 is physically cut off so that the first jack is permanently connected to the special telephony equipment 50.

Figure 5:
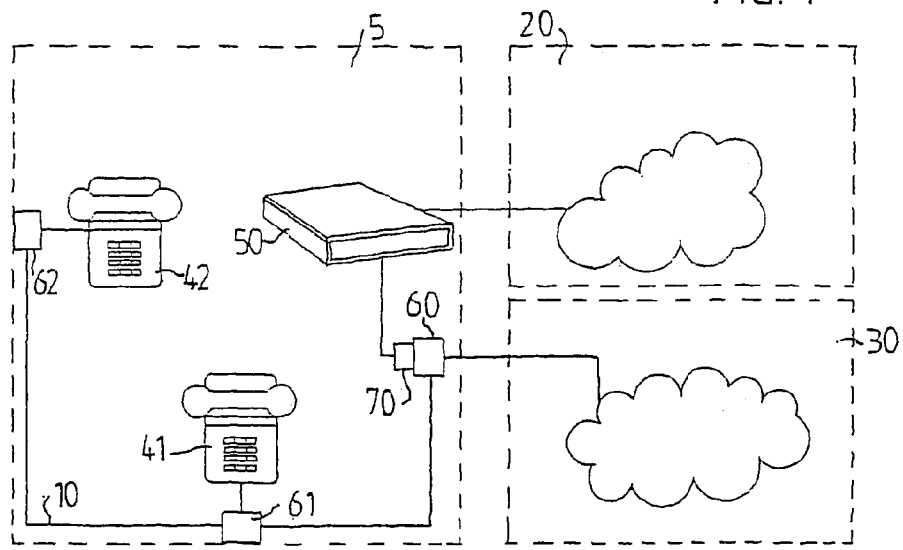
FIG. 5 is a schematic view, illustrating how local telephony equipment can be connected to special telephony equipment instead of the PSTN by means of a special, plug.

A network for connecting local telephony equipment and allowing optional use of conventional or IP telephony, generally connection of devices either to the PSTN or another network, is schematically illustrated in FIG. 5. A converted telephony plug 70 is inserted into the first jack 60 of the local telephony network 10. Analog telephones 41 and 42 are connected to other jacks 61 and 62 respectively of the local telephony network within the residential or office area 5. The jacks 60, 61 and 62 are serially connected to each other, such that if no plug is inserted into a particular jack, or if an analog telephone is connected to the jack but the telephone handset is not lifted, this jack becomes bypassed or transparent for signals, in such a way that possible signals will pass on to the next jack in the series. On the other hand, with analog telephones connected to jacks 61 and 62, the first telephone the receiver of which is lifted becomes a unique communication unit of the local telephony network 10. The first jack 60 of the local telephony network 10, which is normally connected to the local exchange in the PSTN 30, is here connected to special telephony equipment 50 via the special plug 70. The special telephony equipment 50 is furthermore permanently connected to an access network 20 and functions, as mentioned above, as a signal converter, in order to adapt the formats of the signals of the local telephony network 10 and the access network 20 to each other.

Figure 6:
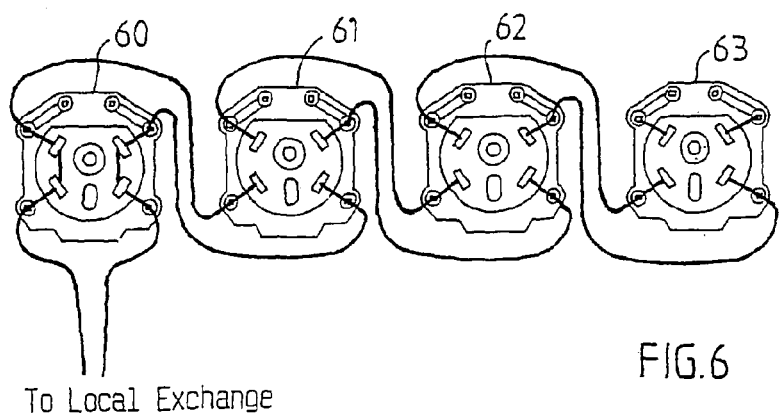
FIG. 6 is a schematic view of jacks in a local telephony network where the first jack is unplugged while all other jacks are connected to local analog telephones.
Figure 7:
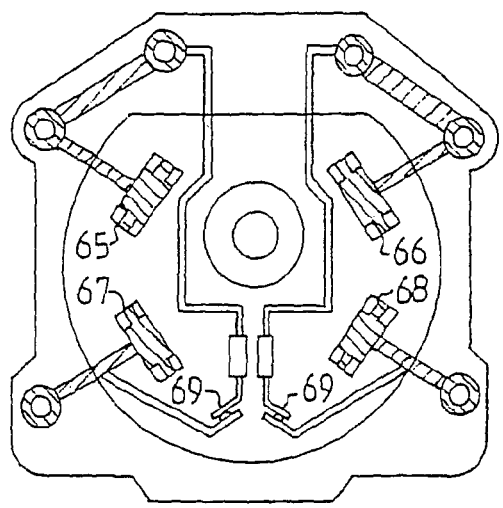
FIG. 7 is a view of the internal connections of a standard jack with no plug inserted.
Figure 8:
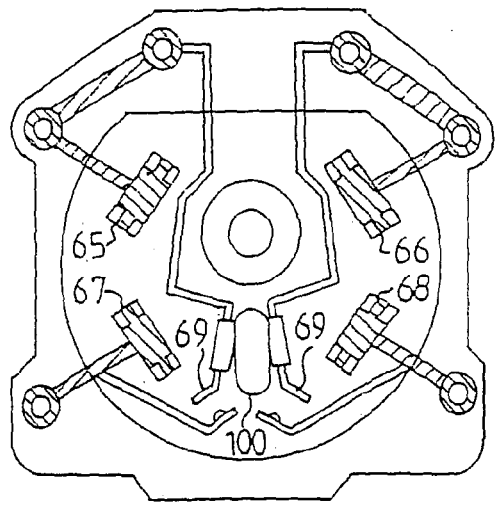
FIG. 8 is a view of the internal connections of a standard jack with a plug inserted.

The local telephony network 10 is first to be described in somewhat more detail, with its connection to the local exchange in the PSTN 30. To simplify the description, plugs and jacks according to Swedish standards are considered in the following, but the invention can also include other types of plugs and jacks as long as they have similar properties. In FIG. 6 interconnected jacks of the local telephony network are seen, where another jack 63 has been added to the three jacks 60, 61 and 62. The internal configuration of a jack is shown in FIG. 7. Each jack has four contact members 65, 66, 67 and 68, and a hole for a rigid pin 100, see FIG. 8. When no plug is inserted into a jack each member of the pair of upper contacts 65, 66 of the jack is directly connected to the corresponding member of the pair of lower contacts 67, 68 via special spring contacts 69. On the other hand, by inserting a plug into a jack the rigid pin 100 thereof forces the special spring contacts 69 to separate, so that the pairs of upper and lower contacts 65, 66 and 67, 68 either become isolated from each other or become connected via the equipment attached to the plug. In FIG. 6 all jacks are seen to be serially connected, i.e. the lower contact pair 67, 68 of one jack connects to the upper contact pair 65, 66 of a subsequent jack. FIG. 6 also indicates that the first jack 60 is unplugged. Analog telephones, not shown, are furthermore supposed to be connected to the other three jacks 61, 62 and 63 respectively. The internal connections of these telephones are not shown.

Figure 9:
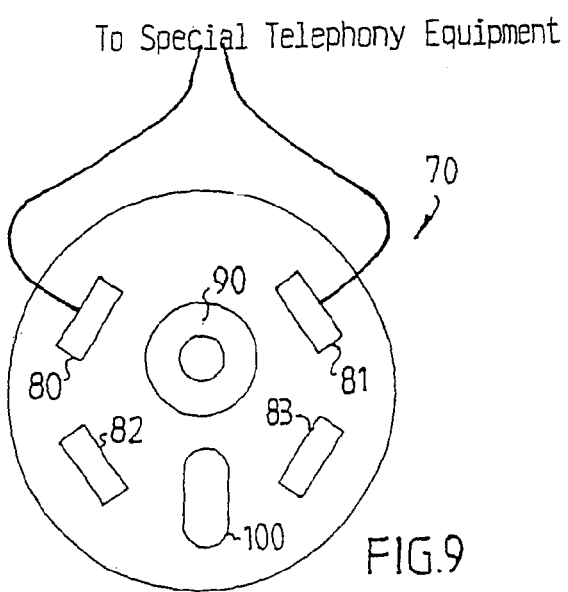
FIG. 9 is a view of the pin configuration of a special plug.

By inserting the converted plug 70 into the first jack 60 the incoming line pairs of the local telephony network 10 becomes rerouted from the local exchange in the PSTN 30 to the analog input/output terminal of the special telephony equipment 50. This can be achieved by constructing a plug that only uses its upper pin pair 80, 81, as seen in FIG. 9. The lower pin pair 82, 83 of the converted plug is not to be connected. In this way, the local exchange in the PSTN 30 becomes disconnected. The plug is kept together by a screw 90 and has in the standard manner a rigid, projecting pin 100, which upon inserting the plug into a jack, will break the direct connection between the upper and the lower contact pairs 65, 66 and 67, 68 respectively of the jack.

The modified connections of the first jack with a converted plug inserted are seen in FIG. 10. Firstly, the upper contact pair 65, 66 of the first jack 60 is connected to the lower contact pair 67, 68 of the second jack 61 as usual. The modification consists in connecting the analog input/output pair terminal of the special telephony equipment to this upper contact pair, in parallel with the lower contact pair of the second jack. The further connections of the other jacks 62 and 63 are as usual.

With the converted plug 70 inserted into the first jack 60 and local, analog telephones 41, 42 and 43 connected to the jacks 61, 62 and 63 respectively, the local telephones will function as analog interfaces against the special telephony equipment 50. Necessary D.C. power for the local telephones will be supplied from the special telephony equipment instead of the PSTN.

The use of the converted plug 70 does not give the option to use the PSTN if no activity is present on the access network. As a second embodiment it may then be of interest to consider a converted plug 110, see FIG. 11. Here, the upper pin pair 80, 81 can be switched between a line pair connected to the input/output terminal of the special telephony equipment 50 and the lower pin pair 82, 83, which is connected to the local exchange in the PSTN. The selector switch may be a manual, double-pole, double-throw switch 120 directly mounted on the plug, see FIG. 12.

Figure 13:
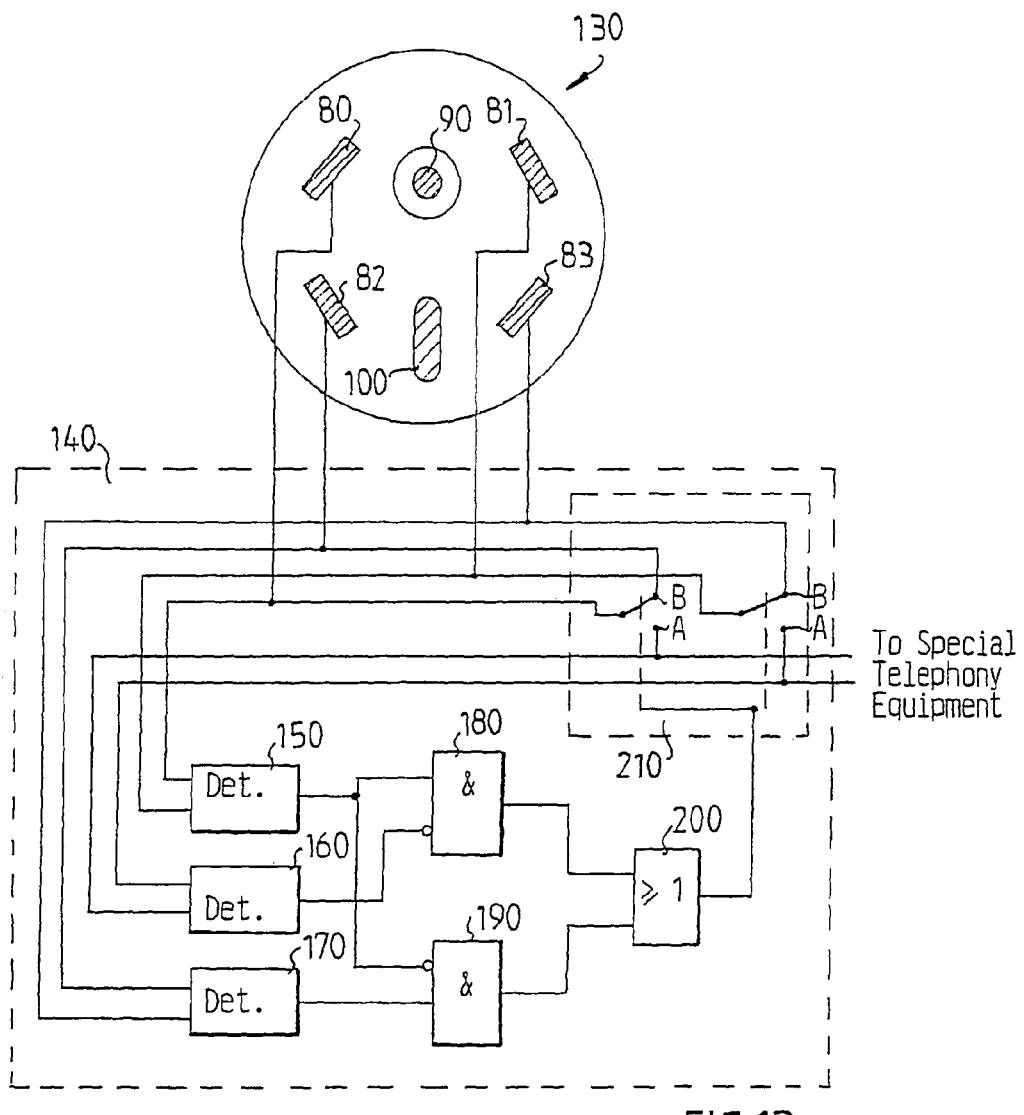
FIG. 13 is a schematic view of a special plug provided with an automatic switching unit.

A third embodiment consists of another converted plug 130, in which the manual switch 120 is replaced by an automatic switching unit 140, see FIG. 13. The function of this unit is the following. In the normal case the upper pin pair 80, 81 is connected to the special telephony equipment. If no dial tone is detected after off-hook, i.e. after a telephone receiver has been lifted, this means that no telephony service is available from the special telephony equipment and therefore the upper pin pair 80, 81 becomes connected to the lower pin pair 82, 83. If a ringing signal should appear from the PSTN while on-hook, the upper pin pair 80, 81 connects to the lower pin pair 82, 83.

The unit 140 contains detectors 150, 160, 170, two AND elements 180 and 190, where one of the inputs of each element is inverting, an OR element 200 and a switch 210. The output of the detector 150 obtains a logic "high" level if there is an off-hook within the local telephony network 10, and the output of the detector 160 becomes "high," if, after off-hook, there is a dial tone present from the access network 20, routed through the input/output terminal of the special telephony equipment. The output of the detector 170 obtains a logic "high" level if a ringing signal from the PSTN 30 appears across the lower pin pair 82, 83. The output of the detector 150 is fed both to the noninverting input of the AND element 180 and the inverting input of the AND element 190, the output of the detector 160 is fed to the inverting input of the AND element 180 and the output of the detector 170 is fed to the noninverting input of the AND element 190. Each output of the AND elements 180 and 190 is fed to a separate input of the OR element 200. The output of the OR element controls the position of the switch 210. A logic "low" level thus sets the switch in position "A", i.e. the upper pin pair 80, 81 is connected to the input/output terminal of the special telephony equipment. Otherwise, a logic "high" level at the output of the OR element sets the switch 210 in position "B", such that the upper pin pair 80, 81 connects to the lower pin pair 82, 83 and further to the PSTN.

The invention has been described above as applied in a local telephony network 10 where the jacks are serially connected and the converted plug 70 is inserted into the first jack, as shown in FIG. 10. If the jacks were all connected in parallel, i.e. the corresponding members of the upper pin pairs of the jacks were all connected together, it would still be possible to use the converted plug, only that it still is inserted into the first jack. However, in the case of parallel connection, other problems might occur due to different loading conditions for the network.

The invention claimed is:

1. A connector plug for use in a first network, the connector plug adapted to be inserted in one or more telephony jacks connected serially in the first network and comprising:
   pins for contacting respective contact members of said jacks, the pins including a first pair of pins and a second pair of pins;
   conductors for connection to a third network or third equipment; and
   a switching unit which is connected between said first pair of pins, said second pair of pins and said conductors, the switching unit having one position, in which said first pair of pins is connected to said conductors and said second pair of pins is disconnected from said conductors, and the switching unit having another position, in which said first pair of pins is disconnected from said conductors and said second pair of pins is connected to said conductors, so that, when the connector plug is inserted in one of the serially-connected jacks, signals from and to subsequent jacks are routed through the connector plug and, in said one position of the switching unit, the subsequent jacks are then connected to the third network or third equipment.

2. The connector plug of claim 1, wherein the switching unit is a manual switch.

3. The connector plug of claim 1, wherein the switching unit is an automatic switching unit including:
   a switch; and
   a detector connected to control the switch to make the switching unit take one of said one position and said another position depending on the result of the detecting.

4. The connector plug of claim 3, wherein the detector is an off-hook detector, the off-hook detector connected to the pins of said first pair, the off-hook detector arranged to detect an off-hook state and to make the automatic switching unit take said another position if no off-hook state is detected.

5. The connector plug of claim 3, wherein the detector is a dial tone detector, the dial tone detector connected to the lines to the third network or third equipment for detecting dial tones for making the automatic switching unit take said one position if a dial tone from the third network or third equipment is detected.

6. The connector plug of claim 3, wherein the detector is a ringing signal detector, the ringing signal detector connected to the pins of said second pair, the ringing signal detector arranged to detect ringing signals and to make the automatic switching unit take said another position if a ringing signal is detected.

7. The connector plug of claim 1, wherein the switching unit is an automatic switching unit including:
   a switch;
   an off-hook detector, the off-hook detector connected to the pins of said first pair, the off-hook detector adapted to detect an off-hook state and to make the automatic switching unit take said another position if no off-hook state is detected;
   a dial tone detector, the dial tone detector connected to the lines to the third network or third equipment for detecting dial tones for making the automatic switching unit take said one position if a dial tone from the third network or third equipment is detected; and
   a ringing signal detector, the ringing signal detector connected to the pins of the second pair, the ringing signal detector arranged to detect ringing signals and to make the automatic switching unit take said another position if a ringing signal is detected.

* * * * *